(12) United States Patent
Kanno

(10) Patent No.: US 7,729,265 B2
(45) Date of Patent: Jun. 1, 2010

(54) TEST METHOD FOR NETWORK RELAY APPARATUS AND NETWORK RELAY APPARATUS

(75) Inventor: Masayuki Kanno, Kawasaki (JP)

(73) Assignee: Fujistu Limited, Kawasaki (JP)

( * ) Notice: Subject to any disclaimer, the term of this patent is extended or adjusted under 35 U.S.C. 154(b) by 583 days.

(21) Appl. No.: 11/638,393

(22) Filed: Dec. 14, 2006

(65) Prior Publication Data

US 2008/0025225 A1    Jan. 31, 2008

(30) Foreign Application Priority Data

Jul. 31, 2006   (JP)   ............................. 2006-207810

(51) Int. Cl.
*H04L 12/26* (2006.01)
(52) U.S. Cl. .................. 370/242; 370/246; 370/249; 370/252; 370/395.31; 370/474
(58) Field of Classification Search ................. 370/241, 370/244, 245, 248, 249, 252, 253
See application file for complete search history.

(56) References Cited

U.S. PATENT DOCUMENTS

| 6,937,594 | B2 * | 8/2005 | Smith et al. ................. 370/352 |
| 2004/0030977 | A1 * | 2/2004 | Jiang et al. .................. 714/742 |
| 2004/0081101 | A1 * | 4/2004 | Bennett ...................... 370/252 |
| 2004/0208129 | A1 * | 10/2004 | Old et al. .................... 370/241 |
| 2005/0135363 | A1 * | 6/2005 | Horinouchi et al. ......... 370/389 |

FOREIGN PATENT DOCUMENTS

JP    2000-151701    5/2000

* cited by examiner

*Primary Examiner*—Ricky Ngo
*Assistant Examiner*—Rasheed Gidado
(74) *Attorney, Agent, or Firm*—Staas & Halsey LLP

(57) ABSTRACT

A transfer path in a router is set in a loop shape by a test processing unit. In a NP chip (network processor), decrement of a TTL value is inhibited by a test processing unit, and a routing table is set such that data are transmitted in order along the transfer path of the loop shape. Consequently, the test processing unit circulates a predetermined number of data on the transfer path of the loop shape, and inspects the data circulated.

17 Claims, 12 Drawing Sheets

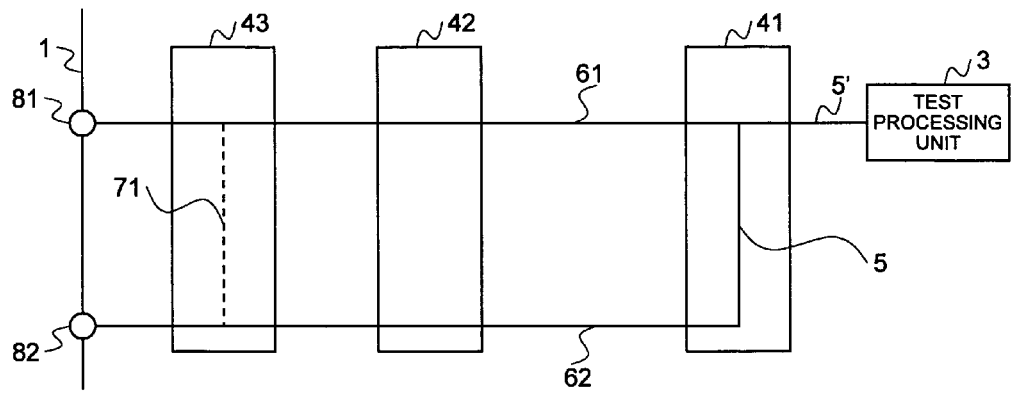
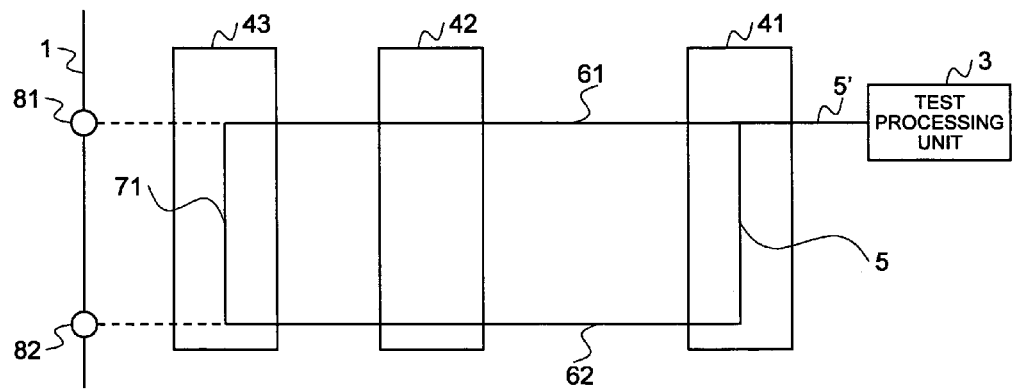
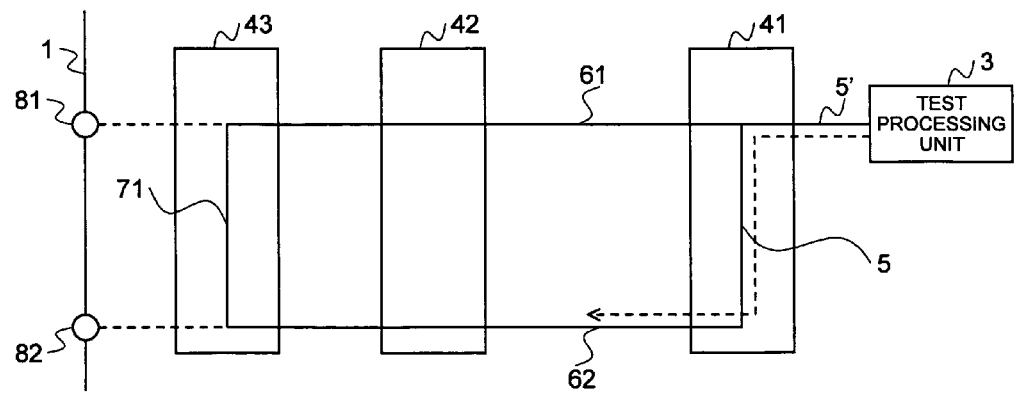

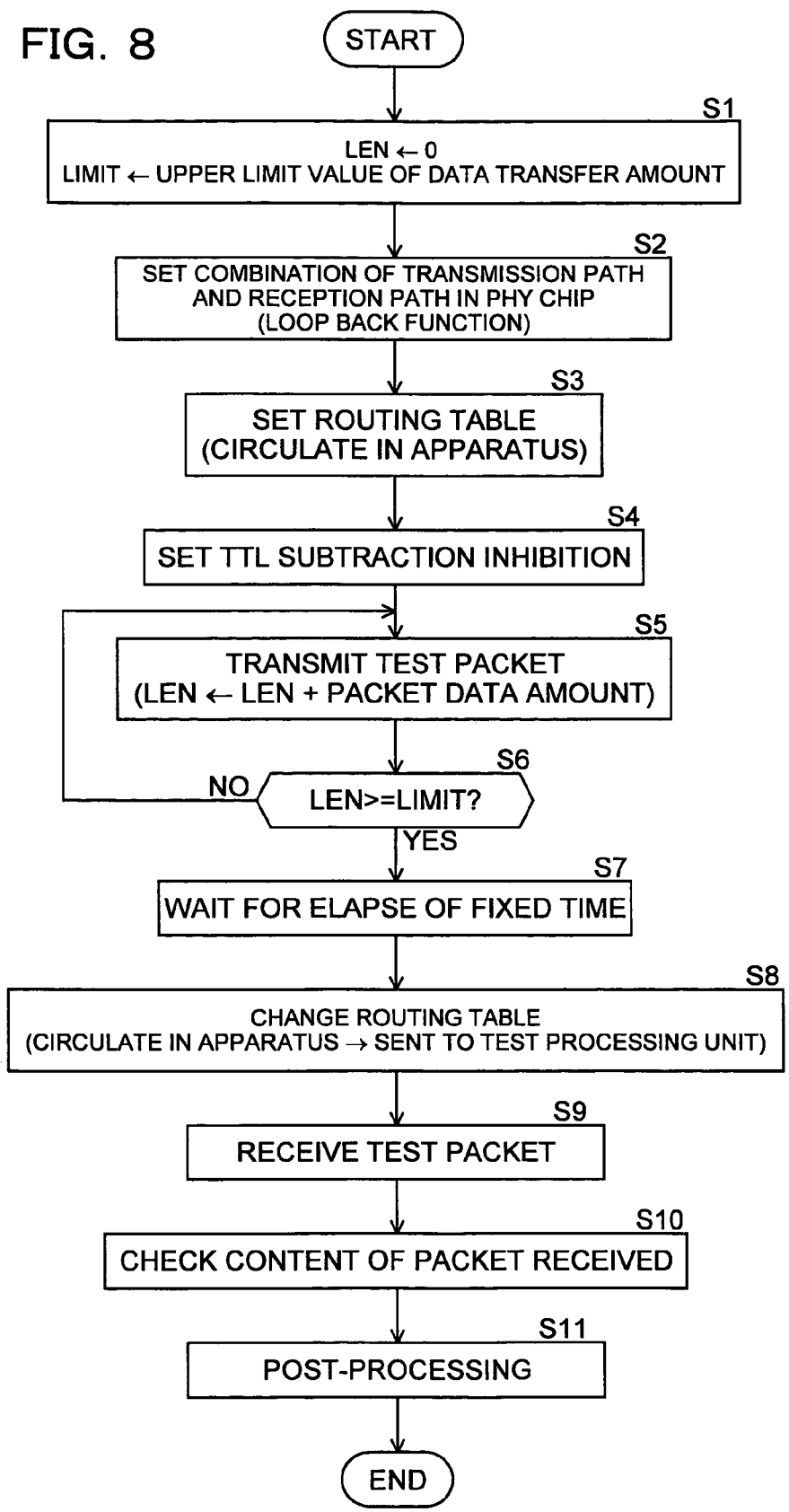

| | ID0 | ID1 | ID2 | ID3 | ID4 | ID5 |
|---|---|---|---|---|---|---|
| TRANSFER DESTINATION OF RECEIVED PACKET FROM PORT #0 | PORT #1 | NO SETTING | NO SETTING | NO SETTING | NO SETTING | NO SETTING |
| TRANSFER DESTINATION OF RECEIVED PACKET FROM PORT #1 | PORT #2 | NO SETTING | NO SETTING | NO SETTING | NO SETTING | NO SETTING |
| TRANSFER DESTINATION OF RECEIVED PACKET FROM PORT #2 | PORT #0 | NO SETTING | NO SETTING | NO SETTING | NO SETTING | NO SETTING |

| | ID0 | ID1 | ID2 | ID3 | ID4 | ID5 |
|---|---|---|---|---|---|---|
| TRANSFER DESTINATION OF RECEIVED PACKET FROM PORT #0 | PORT #0 | NO SETTING | NO SETTING | PORT #1 | NO SETTING | PORT #2 |
| TRANSFER DESTINATION OF RECEIVED PACKET FROM PORT #1 | NO SETTING | PORT #1 | NO SETTING | PORT #0 | PORT #2 | NO SETTING |
| TRANSFER DESTINATION OF RECEIVED PACKET FROM PORT #2 | NO SETTING | NO SETTING | PORT #2 | NO SETTING | PORT #1 | PORT #0 |

TEST METHOD FOR NETWORK RELAY APPARATUS AND NETWORK RELAY APPARATUS

CROSS-REFERENCE TO RELATED APPLICATIONS

This application claims the conventional priority based on Japanese Patent Application No. 2006-207810, filed on Jul. 31, 2006, the disclosures of which are incorporated herein by reference.

BACKGROUND OF THE INVENTION

1. Field of the Invention

This invention relates to a test method for a network relay apparatus and a network relay apparatus, and more particularly to a test method for a network relay apparatus and a network relay apparatus for testing a margin for data transfer processing of the network relay apparatus.

2. Description of the Related Art

With an increase of speed, improvement of integration, and a reduction in voltage of a router (an IP router), it becomes difficult to perform design with a margin secured. Therefore, there is a possibility that a lack of a margin with respect to noise jitter of a signal causes a failure. The failure due to a lack of a margin is apparent when the router operates near a performance limit. Thus, it is necessary to perform a test concerning whether or not a margin for a function of data transfer processing is sufficiently secured by creating a state in which a test object router (a router to be tested or router under test) transfers an amount of data in the performance limit.

For example, as shown in FIG. 12A, a test apparatus 102 that generates and transmits a test packet is connected to the outside of a test object router 101, and continuously transmits packets to the test object router 101. Consequently, the test packet relayed by the test object router 101 is received by the test apparatus 102, and is used for an inspection on whether the test packet has arrived and an inspection of content of the test packet.

It is assumed that a standard of transfer performance of an interface (e.g., Ethernet (registered trademark) GbE), which connects the test object router 101 and the test apparatus 102, as shown in FIG. 12B, is transfer performance of 1 Gbps (Giga-bit per second). Usually, transfer performance of the test object router 101 is designed to be 1.2 Gbps, for example, taking a margin into account such that the transfer performance exceeds the standard of 1 Gbps of the transfer performance of the interface. However, it is impossible to transmit and receive a test packet exceeding the transfer performance of the interface. Therefore, in this case, it is impossible to perform, for a router designed taking a margin into account, a test with attention paid to an upper limit value of a data transfer amount.

Thus, it can be guessed that a test is performed within the test object router 101, without using the test apparatus 102 on the outside of the router 101. In this case, as shown in FIG. 12C, generation, transmission, reception, and inspection of a test packet are performed in a plurality of semiconductor devices (chips) 1041 to 1044, which are constituting the test object router 101.

On the other hand, in the present router, a switching capacity is enormous, and transmission and reception paths are separately mounted (a structure capable of performing full duplex communication is adopted). Therefore, it is necessary to create a state in which a large number of test packets are simultaneously transferred within the test object router 101, and verify an operation. Thus, for example, it is known to create a state in which one test packet passes a transfer path a plurality of times and increase of a transfer load, due to use of a return mechanism and contriving of set of a TTL (Time to Live) value of a test packet inside of a test object router (Patent Document 1; Japanese Patent Application Laid-open No. 2000-151701).

According to our examinations, there are problems described below when a test is performed within the test object router 101 as described above.

As shown in FIG. 12C, a test processing program 1031 for performing generation and transmission of a test packet is provided in the semiconductor device 1041. Therefore, test processing in the semiconductor device 1041 is added, and packet transmission performance of the semiconductor device 1041 is deteriorated by an amount equivalent to the addition. In the semiconductor device 1044 provided with the test processing program 1032 for performing reception and inspection of a test packet, packet reception performance is deteriorated similarly. Therefore, it is difficult to transfer test packets of a number satisfying the upper limit value of the data transfer amount.

In the test object router 101 a packet transfer path is usually constituted by special hardware. Thus, transfer speed on the path is higher than speed (frequency or transmission intervals T1) of transmission of a packet by a CPU. For example, in the technique described in the Patent Document 1, as shown in FIG. 12D, it is assumed that a test packet P1 transmitted by the CPU loops 255 times in the transfer path, and then returns to the CPU. However, there is a strong possibility that the test packet P1 returns to the CPU before the CPU transmits a test packet P2. Therefore, as shown by a dotted line in FIG. 12D, it is impossible to transmit the next test packet P2 while the test packet 1 loops in the transfer path. This makes it difficult to create a state in which a large number of packets P1, P2, . . . are simultaneously transferred on the path.

SUMMARY OF THE INVENTION

It is an object of the invention to provide a test method for a network relay apparatus for testing a margin for a function of data transfer processing by easily creating a state in which an amount of data in a performance limit is transferred within a network relay apparatus to be tested (test object network relay apparatus).

It is another object of the invention to provide a network relay apparatus that tests a margin for a function of data transfer processing by easily creating a state in which an amount of data in a performance limit is transferred within a test object network relay apparatus.

A test method for a network relay apparatus according to the invention is a test method for a network relay apparatus for testing a transmission and reception ability thereof. The test method includes setting a transfer path in the network relay apparatus in a loop shape, inhibiting, in at least one circuit unit that is present on the transfer path and decrements a TTL value included in data which is to be transmitted, decrement of the TTL value, setting, in at least one circuit unit that is present on the transfer path and includes a routing table, the routing table such that data is transmitted in order along the transfer path set in the loop shape, transmitting a predetermined number of data on the transfer path set in the loop shape to thereby circulate the predetermined number of data on the transfer path set in the loop shape, and inspecting the data circulated.

Preferably, in an aspect of the invention, the transfer path is set in the loop shape by connecting, within the network relay apparatus, a reception path serving as a path on which data received by the network relay apparatus is transmitted and a transmission path serving as a path on which data transmitted by the network relay apparatus is transmitted.

Preferably, in another aspect of the invention, the transfer path is set in the loop shape by connecting an input terminal and an output terminal of the network relay apparatus using a connection cable.

Preferably, in still another aspect of the invention, the data circulated are collected by changing, in at least one circuit unit that is present on the transfer path and includes the routing table, the routing table such that data received by the circuit unit is transmitted to a circuit unit that performs the inspection.

A network relay apparatus (or a router) according to the invention is a network relay apparatus capable of testing a transmission and reception ability thereof. The network relay apparatus includes loop setting means for setting a transmission path in the network relay apparatus in a loop shape, TTL setting means for inhibiting, in at least one circuit unit that is present on the transfer path and decrements a TTL value included in transmission object data, decrement of the TTL value, setting means for setting, in at least one circuit unit that is present on the transfer path and includes a routing table, the routing table such that data is transmitted in order along the transfer path set in the loop shape, and test processing means for transmitting a predetermined number of data on the transfer path set in the loop shape to thereby circulate the predetermined number of data on the transfer path set in the loop shape and inspecting the data circulated.

According to the test method for a network relay apparatus and the network relay apparatus (or a router) of the invention, a transfer path is set in a loop shape, decrement of a TTL value is inhibited, and a predetermined number of data are circulated on the transfer path set in the loop shape. This makes it possible to create a state in which, for example, data such as a packet continues to circulate on the transfer path set in the loop shape. Therefore, in the network relay apparatus, even when the transfer path is constituted by dedicated hardware and transfer speed is extremely high, it is possible to control an amount of data transfer on the transfer pat regardless of speed of transmission of the packet by a CPU (frequency of transmission or time intervals). As a result, it is possible to create a state in which a large number of data transferred is present on the transfer path and create a state of a performance limit for a function of data transfer processing. Therefore, it is possible to perform a test for detecting a failure due to a lack of a margin (a data transfer margin) for the function of the data transfer processing (a data transfer margin test).

According to an aspect of the invention, the transfer path is set in the loop shape by connecting a reception path and a transmission path within the network relay apparatus. For example, it is possible to use, as means for connection, a loop back path included in the network relay apparatus. This makes it possible to perform, using a function provided in the network relay apparatus, a test of a margin for the function of the data transfer processing within the network relay apparatus.

According to another aspect of the invention, the transfer path is set in the loop shape by connecting an input terminal and an output terminal using a connection cable. This makes it possible to actually perform, within the network relay apparatus, a test of a margin for the function of the data transfer processing.

According to still another aspect of the invention, data circulated are collected by changing the routing table. This makes it possible to perform a test of a margin for the function of the data transfer processing using a function provided in the network relay apparatus.

BRIEF DESCRIPTION OF THE DRAWINGS

FIGS. 4 to 7 are a diagram for explaining the router test method according to the invention.

FIG. 8 is a router test processing flow according to the invention.

DETAILED DESCRIPTION OF THE PREFERRED EMBODIMENTS

Figure 1:
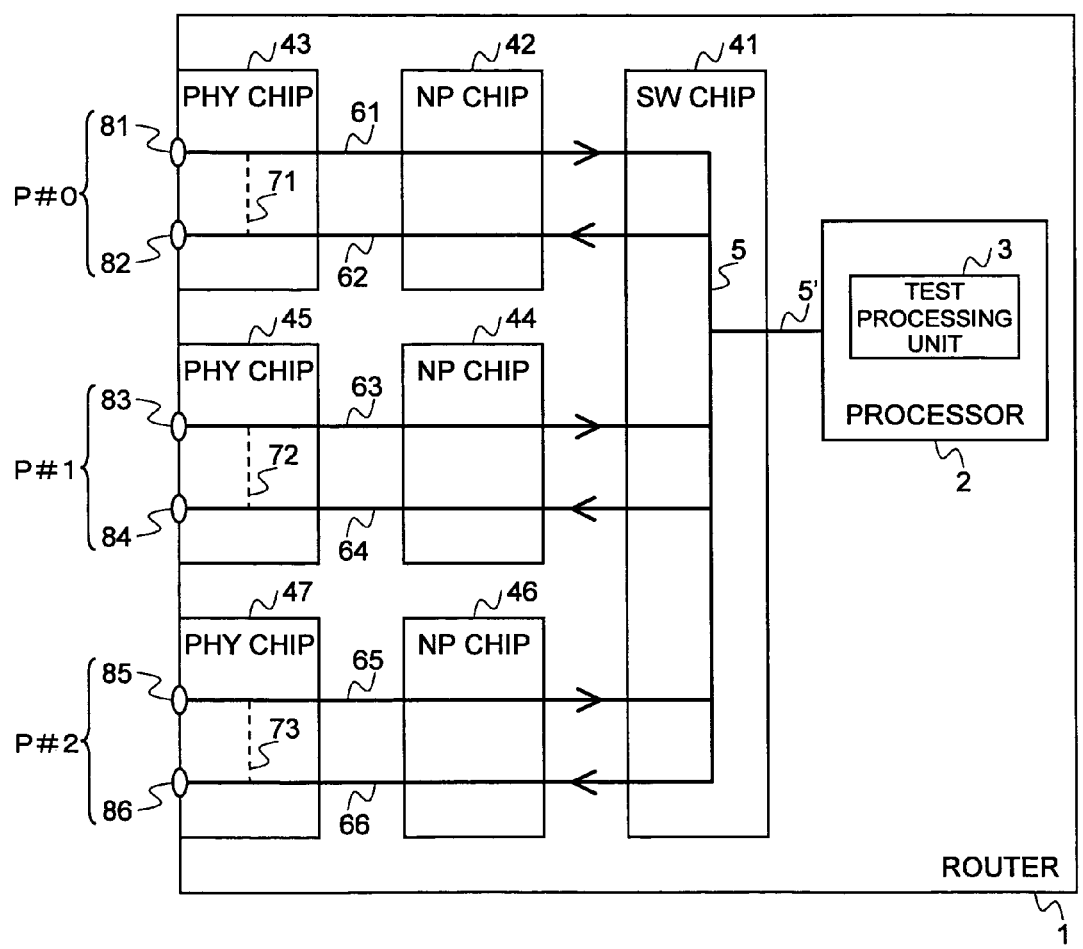
FIGS. 1 to 3 are a diagram showing an example of the structure of the router according to the invention.

FIG. 1 is a diagram showing an example of a structure of a router that realizes a router test method according to the invention. A router 1 is a network relay apparatus (or a communication relay apparatus) connected to a network (not shown). The router 1 has a function (a routing function) of receiving a packet (an IP packet) that is data to be transmitted or received (transmission/reception object data), and of transmitting the received packet to a destination (a transmission destination) described in a header of the packet. The router 1 is a router to be tested or router under test (test object router), and has a function of executing a data transfer margin test within (in the inside of) the router 1.

The router 1 includes a processor 2, a switch LSI (an SW chip) 41, network processor LSIs (NP chips) 42, 44, and 46, and transmission/reception LSIs (PHY chips) 43, 45, and 47. The router 1 also includes communication paths 5 and 5', reception paths 61, 63, and 65, transmission paths 62, 64, and 66, loop back paths 71 to 73, and a plurality of input/output terminals 81 to 86. For example, a port #0 is constituted by an input terminal 81 and an output terminal 82 corresponding to the input terminal 81 (other ports are constituted in the same manner).

The communication paths 5 and 5' are bidirectional communication paths. The communication path 5 is a communication path in the SW chip 41, and connects the reception paths and the transmission paths 61 to 66 in the SW chip 41. The communication path 5' connects the communication path 5 and the processor 2. The reception paths 61, 63, and 65 are communication paths in a single direction (a reception direction) indicated by an arrow in FIG. 1, and are paths on which a packet received by the router 1 is transferred. The transmission paths 62, 64, and 66 are communication paths in a single direction (a transmission direction) indicated by an arrow in FIG. 1, and are paths on which a packet that should be transmitted by the router 1 is transferred.

The communication path 5 (excluding the communication path 5'), the reception paths 61, 63, and 65, the transmission paths 62, 64, and 66, the loop back paths 71 to 73 constitute a transfer path (a data transfer path or a packet transfer path) within the router 1. In this specification, the transfer path means all or a part of theses paths. The SW chip 41, the NP chips 42, 44, and 46, and the PHY chips 43, 45, and 47 are present on the transfer path and constitute a part of the transfer path.

The processor 2 comprises a CPU and a memory (both of which are not shown), and includes a test processing unit 3 that performs a data transfer margin test. The processor 2 is provided at a position separated from the transfer path in the router 1. In this example, the test processing unit 3 is provided as firmware (a test processing program) that operates on the processor 2. The test processing unit 3 is started and performs data transfer margin test processing through a maintenance console (not shown) connected to the router 1, and notifies a result of the data transfer margin test processing to the maintenance console. The test processing unit 3 may be provided as the special hardware other than being provided as a test program on the firmware.

Figure 2A:
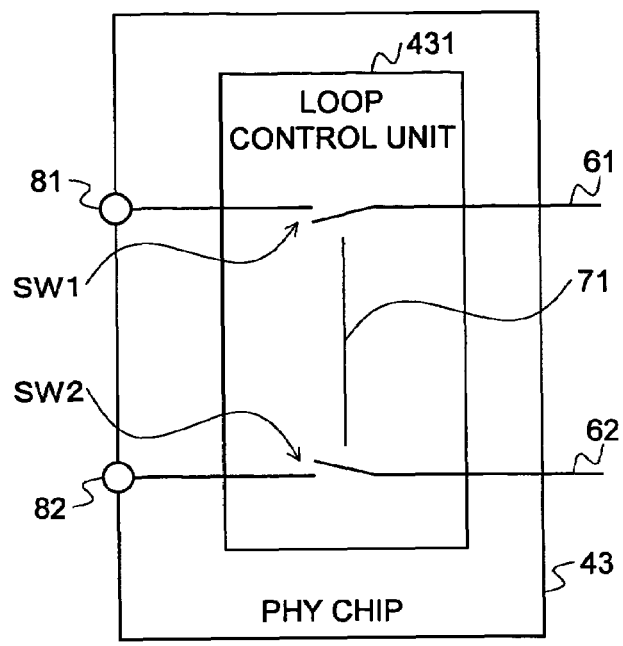

FIG. 2A shows a structure of the PHY chip 43. The PHY chip 43 is an input/output circuit unit (or a line control circuit unit). The PHY chip 43 is provided corresponding to the port #0 or a pair of the input/output terminals 81 and 82, and is provided at a position closest to the input/output terminals on the transfer path (i.e., on a line side). The PHY chip 43 performs input (reception) processing and output (transmission) processing of a packet via the input/output terminal pair corresponding thereto. That is, the PHY chip 43 transmits and receives a packet. The PHY chip 43 includes a loop control unit 431 that connects the reception path 61 and the transmission path 62. The loop control unit 431 includes the loop back path 71 and switches SW1 and SW2 (both of which comprise a MOSFET, for example). The PHY chips 45 and 47 have the same structure as the PHY chip 43.

At the time of a usual operation, the PHY chip 43 transmits a packet received at the input terminal 81 to the NP chip 42, and transmits a packet received from the NP chip 42 to a predetermined transmission destination via the output terminal 82. At this time, the reception path 61 and the transmission path 62 are separated from the loop back path 71 by the switches SW1 and SW2.

At the time of test processing, the PHY chip 43 constitutes a transfer path of a loop shape, and transmits a packet received from the transmission path 62 to the reception path 61 via the loop back path 71. That is, the loop control unit 431 changes over the switches SW1 and SW2, thereby the reception path 61 and the transmission path 62 are connected to the loop back path 71. At this time, the reception path 61 and the transmission path 62 are disconnected from the input terminal 81 and the output terminal 82. Consequently, (a part of) the transfer path is formed in an order of the transmission path 62, the loop back path 71, and the reception path 61.

In this way, in the present invention, the transmission path 62 and the reception path 61 are connected by the loop back path 71, for example. Therefore, the transmission path 62 and the reception path 61 have to be mounted separately (independently from each other), or have to be capable of performing full duplex communication. One or a plurality of sets (pairs) of a transmission path and a reception path are provided. A transfer path is set in the loop shape by combining paths corresponding to one another. Therefore, one or a plurality of transfer paths having the loop shape are also provided (or set).

Figure 2B:
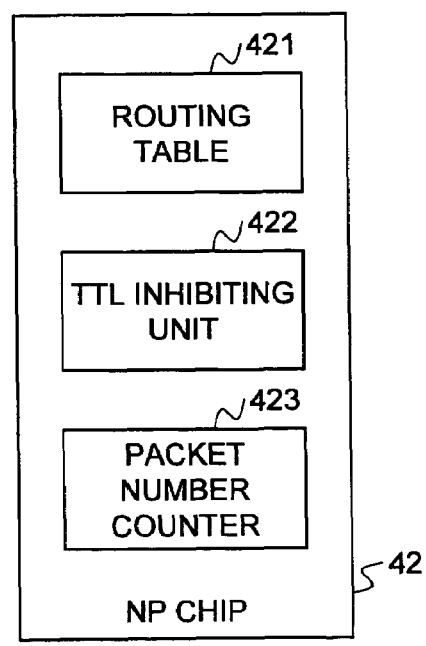

FIG. 2B shows a structure of the NP chip 42. The NP chip 42 is a relay circuit unit that relays a packet from the input/output circuit unit, and is provided according to the port #0 or the PHY chip (the input/output circuit unit) 43. That is, the NP chip 42 analyzes packets received from the PHY chip 43 and the SW chip 41, edits the packets on the basis of the analysis, and transmits the edited packets to the SW chip 41 or the PHY chip 43. The NP chip 42 includes a routing table 421, a TTL inhibiting unit 422, and a packet number counter 423. The NP chips 44 and 46 have the same structure as the NP chip 42.

The NP chip 42 transmits a packet received from a predetermined transmission source (port) to a predetermined transmission destination (port) according to the routing table 421 which defines transfer directions of packets. The routing table 421 sets (or stores), for each (type of) packet, a transmission destination of the packet according to a transmission source of the packet.

At the time of a usual operation, the NP chip 42 decrements a TTL value of the packet by "1" every time the packet is received, for example. That is, the packet has a TTL value described in a predetermined position of a header, and is made to decrement the TTL value every time the packet passes the NP chip 42. A packet which becomes its TTL value "0" is discarded in the NP chip 42. On the other hand, at the time of test processing, the NP chip 42 inhibits decrement (update) of a TTL value of a packet using the TTL inhibiting unit 422. Consequently, it is possible to inhibit the packet from being discarded by decrement processing for the TTL value. Instead of the decrement of the TTL value, the packet number counter 423 counts the number of packets that have passed (or transmitted and received by) the NP chip 42.

Figure 3A:
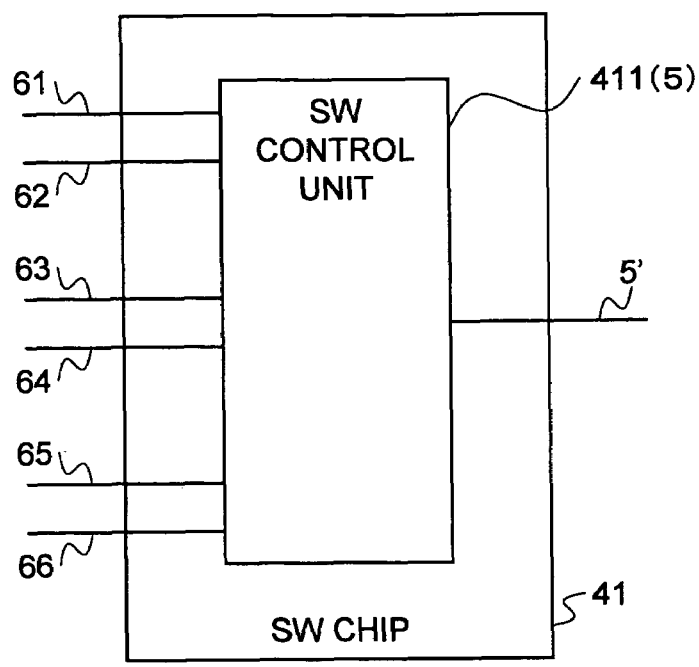

FIG. 3A shows a structure of the SW chip 41. The SW chip 41 is a switch circuit unit, and transmits a packet received from any one of the plurality of NP chips 42, 44, and 46 to any other one of the plurality of NP chips 42, 44, and 46. The SW chip 41 includes a SW control unit 411 which comprises a plurality of switches (e.g., MOSFET), and transmits the packet to a predetermined transmission destination. It may be considered that the plurality of switches and wiring for the switches, both of which constitutes the SW control unit 411, constitute the communication path 5.

The SW chip 41 changes over switches of the SW control unit 411 according to a destination (a transmission destination) of a packet, and thereby transmits the received packet to the predetermined transmission destination. In post-processing of the test processing, the SW chip 41 changes over the switches of the SW control unit 411, and thereby transmits the received packet to the test processing unit 3. Consequently, the packet (the test packet) received by the SW chip 41 is collected by the test processing unit 3.

Figure 3B:
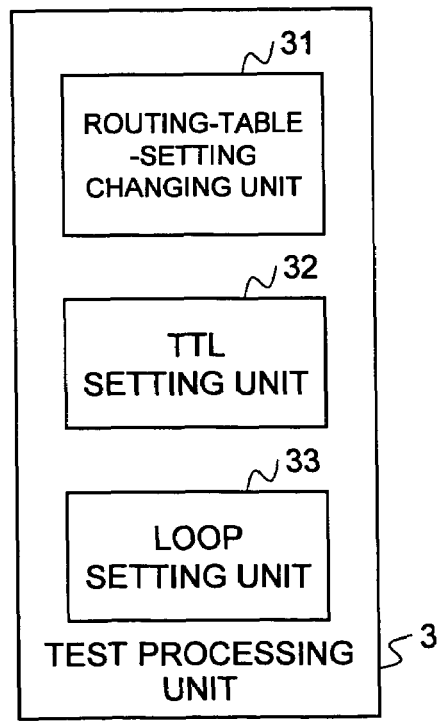

FIG. 3B shows a structure of the test processing unit 3. The test processing unit 3 performs a data transfer margin test within the test object router 1 in order to verify a margin in transmission and reception of a packet. Data transfer margin test processing includes, for example, preprocessing of a test (setting processing for a test mode), actual test processing (transmission/reception processing for a test packet), and post-processing of the test (inspection processing and release processing for the test mode).

The test processing unit 3 includes a routing table setting changing unit (hereinafter simply referred to as table setting unit) 31, a TTL setting unit 32, and a loop setting unit 33. The table setting unit 31 defines a transfer direction of a packet. The TTL setting unit 32 inhibits decrement of a TTL value in the NP chip (or the circuit unit) 42 that decrements a TTL value. The loop setting unit 33 sets a transfer path in the router 1 in a loop shape. The loop setting unit 33 holds an upper limit value of a data transfer amount (hereinafter referred to as upper limit value) "limit", and counts a data transfer amount "len".

Details of the data transfer margin test processing by the test processing unit 3 will be explained with reference to FIGS. 4 to 6 and FIG. 7A.

Figure 4:
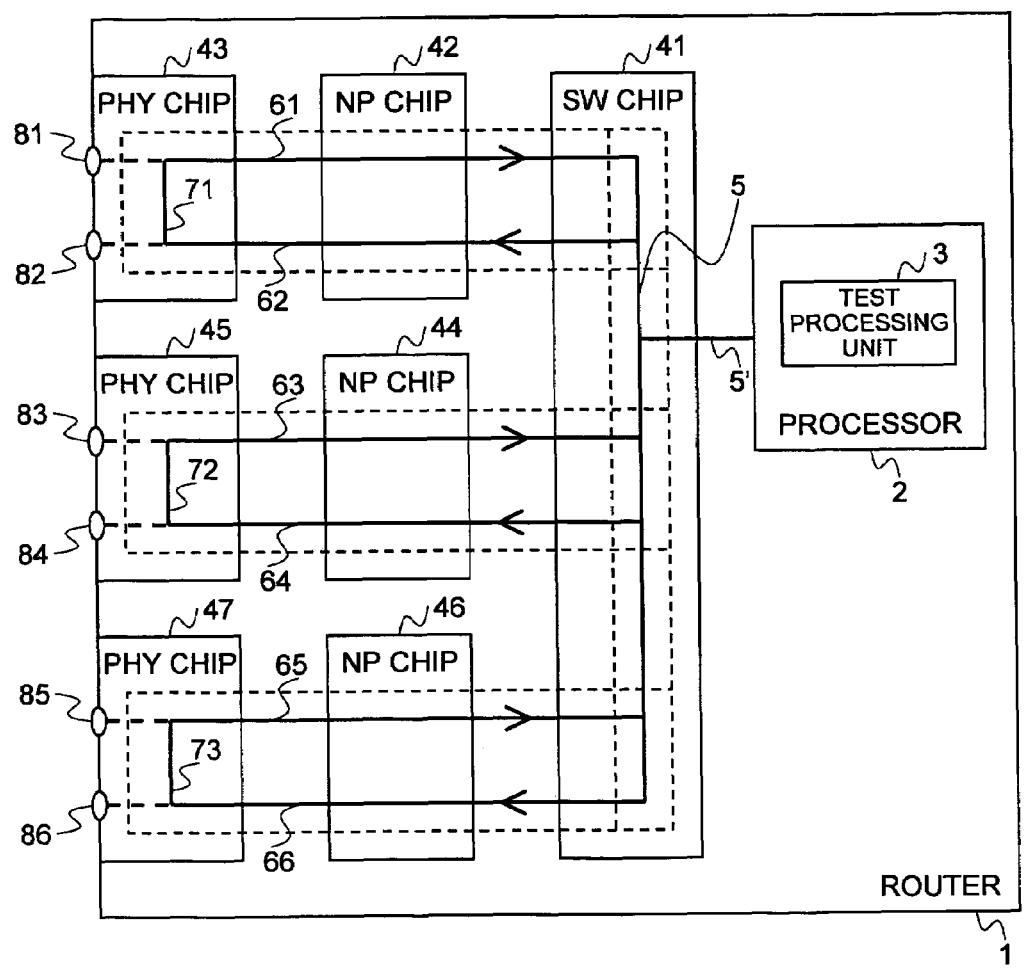

In this example, the test processing unit 3 sets a plurality of transfer paths of a loop shape as shown in FIG. 4. In FIGS. 5A to 5C, 6A to 6C, and 7A, for simplification of an explanation, a data transfer margin test in one transfer path of the loop shape formed by the SW chip 41, the NP chip 42, and the PHY chip 43 will be explained. The test processing unit 3 actually performs the data transfer margin test using the plurality of transfer paths of the loop shape, as shown in FIGS. 9A and 9B and FIGS. 10A and 10B described later.

In the test object router 1, as indicated by a dotted line in FIG. 5A, the reception path 61 and the transmission path 62 are not connected to each other since the loop back path 71 is not connected to these paths.

In this state, as preprocessing of a test, the test processing unit 3 sets a transfer path in a loop shape, sets the routing table 421, and sets inhibition of decrement of a TTL value.

The test processing unit 3 sets a transfer path of the test object router 1 in a loop shape within the test object router 1 by the loop setting unit 33. That is, the loop setting unit 33 instructs the loop control unit 431 to set a loop. According to this instruction, the loop control unit 431 changes over the switches SW1 and SW2, and connects the reception path 61 and the transmission path 62 using the loop back path 71, thereby the transfer path is set in the loop shape. This makes it possible to form the transfer path (a test path) of the loop shape within the router 1, as shown in FIG. 5B.

The test processing unit 3 instructs the NP chip 42 to set (content of) the routing table 421 by the table setting unit 31. According to with this instruction, the NP chip 42 sets content of the routing table 421 as instructed. The content is set such that, for example, a test packet received from the port #0 (i.e., the input terminal 81 or the PHY chip 43) is transmitted to the port #0 (i.e., the output terminal 82 or the PHY chip 43). This makes it possible that the test packet circulates on the transfer path of the loop shape.

The test processing unit 3 instructs the TTL inhibiting unit 422 to inhibit decrement of a TTL value by the TTL setting unit 32. According to this instruction, the TTL inhibiting unit 422 inhibits (prohibits) decrement of the TTL value in the NP chip 42. This makes it possible to prevent the test packet circulating on the transfer path from being discarded in the middle of the circulation.

Moreover, the test processing unit 3 holds the upper limit value "limit" according to an input from the maintenance console connected to the router 1. The upper limit value "limit" is determined taking into consideration margins of processing performance of the NP chip 42 and the like, transfer performance of transfer paths (or buses), a capacity of a buffer memory (not shown) on the transfer paths, and the like. This makes it possible to transmit test packets of a number satisfying (exceeding or dose to) the upper limit value "limit", and perform an appropriate test for the margins.

The preprocessing of the test is completed. Subsequently, as transmission/reception processing for test packets, the test processing unit 3 generates test packets, transmits the test packets on the transfer paths of the loop shape, and receives (or collects) the test packets circulated.

First, the test processing unit 3 generates a test packet. A destination (a transmission destination) of the generated test packet is decided in advance, and is set as the port #0, for example. A packet length of the test packet is decided in advance, and described in a header of the test packet for inspection. Content of data of the test packet is decided in advance, and recorded in a memory (not shown) for inspection. Since a TTL value is not decremented, the TTL value only has to be equal to or larger than "1".

Thereafter, the test processing unit 3 transmits a predetermined number of test packets to the transfer path of the loop shape by using the upper limit value "limit" and the data transfer amount "len". Consequently, the test processing unit 3 circulates the predetermined number of packets on the transfer path.

First, as indicated by a dotted line in FIG. 5C, the test processing unit 3 transmits the test packet to the SW chip 41 via the communication path 5'. Since the destination of the test packet is the port #0, the SW chip 41, which has received the test packet, transmits the test packet to the NP chip 42 via the transmission path 62 corresponding to the port #0.

Figure 6A:
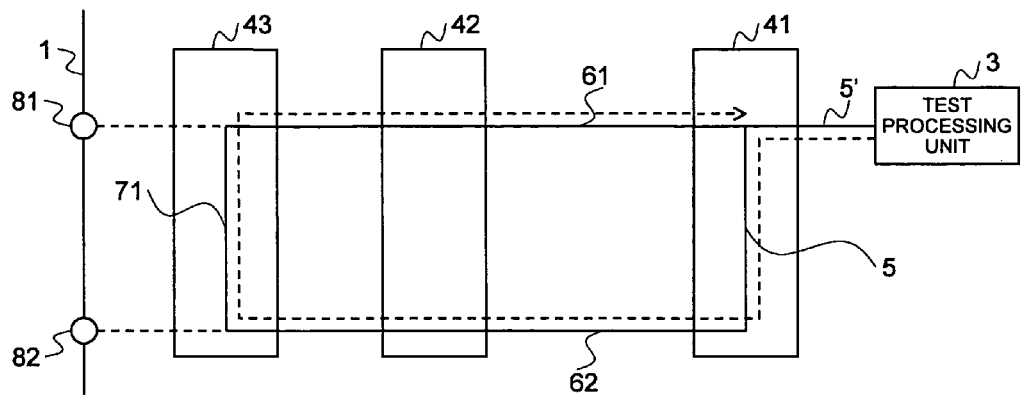

The test packet transmitted in this way circulates on the transfer path of the loop shape once, and returns to the SW chip 41, as indicated by a dotted line in FIG. 6A, according to the routing table 421 of the NP chip 42.

In other words, the NP chip 42 analyzes the test packet, knows the port #0 as the destination of the test packet, and transmits the test packet to the port #0 via the transmission path 62. At this time, the TTL inhibiting unit 422 inhibits decrement of the TTL value of the test packet, and the packet number counter 423 (for the transmission path 62) counts the number of packets transmitted. In the port #0 (or the PHY chip 43), the test packet is forcibly returned (or folded) by the loop back path 71, and transmitted to the NP chip 42 via the reception path 61. The NP chip 42 analyzes the test packet, knows that the test packet is received from the port #0, edits a destination of the test packet as the port #0, and transmits the test packet to the SW chip 41 via the reception path 61 in order to transmit the test packet to the port #0. At this time, as in the above case, the TTL inhibiting unit 422 inhibits decrement of the TTL value of the test packet, and the packet number counter 423 (for the reception path 61) counts the number of packets received.

Figure 6B:
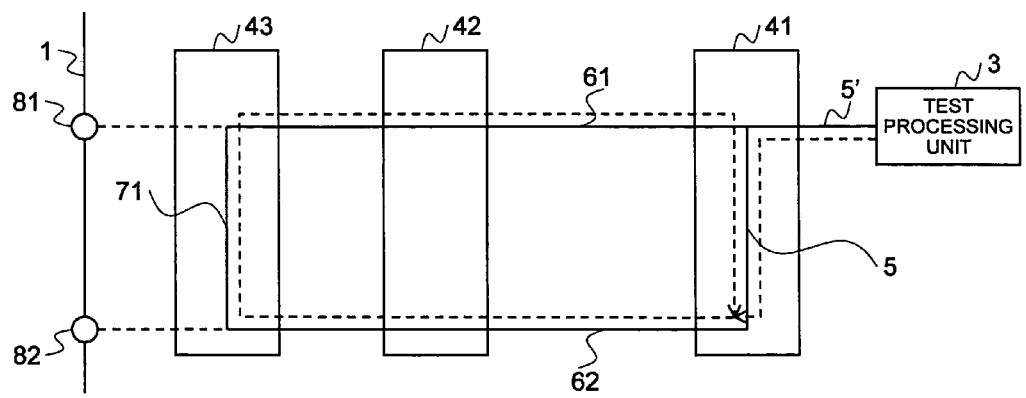

Since the destination of the test packet is the port #0, the SW chip 41, which has received the test packet, transmits the test packet to the NP chip 42 via the transmission path 62, as indicated by a dotted line in FIG. 6B. The SW chip 41 also transmits the test packet received from the test processing unit 3 via the communication path 5' to the NP chip 42, as indicated by a dotted line in FIG. 6B.

The test processing unit 3 repeatedly transmits the test packets until the number of transmitted test packets reaches the upper limit value "limit". During the transmission, since decrement of the TTL value is inhibited, the test packets are not discarded. Consequently, the test packets of the number corresponding to the upper limit value "limit" circulate on the transfer path of the loop shape.

Figure 6C:
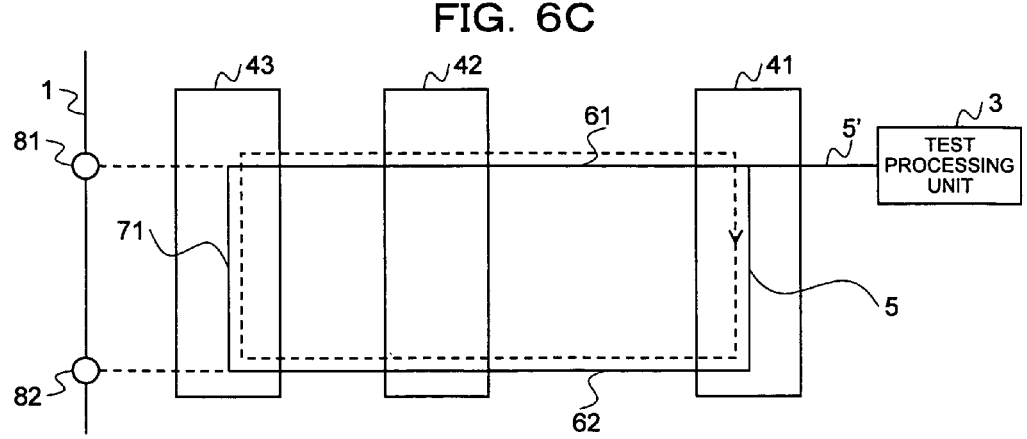

After transmitting the test packets of the number corresponding to the upper limit value "limit" (a predetermined number), the test processing unit 3 stops the transmission of the test packets as indicated by a dotted line in FIG. 6C, and waists for a predetermined time to pass away. At this point, as indicated by the dotted line in FIG. 6C, the test packets of the number corresponding to the upper limit value "limit" circulate on the transfer path of the loop shape. Consequently, a data transfer margin test is just performing. That is, the test object router 1 is in an actual test state.

During this actual test state, the test processing unit 3 is in a waiting state for waiting for the predetermined time to pass away. Therefore, since the processor 2 does rarely execute (or stops) the processing for a test, there is almost no load of the test on the processor 2. This makes it possible to perform the test in a state close to an actual operation state (a state without a load of the test) of the test object router 1.

Since the test packets continue to circulate, an amount of data transferred on the transfer path depends on only an "amount of data" of the test packets, and does not depend on "transmission frequency (intervals of transmission)" of the test packets. Therefore, when (an amount of data of) the test packets of the number corresponding to the upper limit value "limit" is transmitted, packet transfer in a performance limit is carried out within the test object router 1. This makes it possible to transmit and test the test packets of a number which is equal to or larger than a data transfer amount defined in an interface and which is hard to realize in the past.

Moreover, by carrying out a test with attention paid to the test packets of the number corresponding to the upper limit value "limit", it is possible to verify a margin near a limit of performance of data transfer within the test object router 1. Therefore, it is possible, and is difficult in the past, to detect a failure due to a margin in a design verification and manufacturing process.

When the predetermined time passes away in the state of FIG. 6C, the test processing unit 3 changes the routing table 421 by the table setting unit 31, and receives (or collects) the test packet circulated. The predetermined time is the time from the stop of the transmission of the test packet, that is, time after the predetermined number of packets circulate on the transfer path, and time required by a test packet transmitted last to circulate on the transfer path at least once. The collection of the test packets according to the change of the routing table 421 may be considered as post-processing. Specifically, the table setting unit 31 instructs the NP chip 42 to set (content of) the routing table 421. The content is set such that, for example, a test packet received from the port #0 is transmitted to the processor 2 on which the test processing unit 3 operates. This makes it possible to route the test packets to the processor 2, and receive the test packet in the test processing unit 3.

Figure 7A:
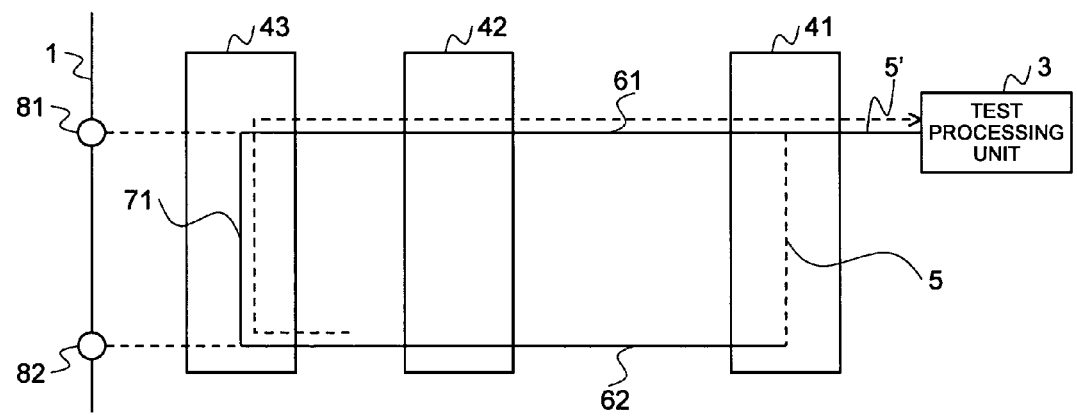

According to this setting change, as shown in FIG. 7A, the SW chip 41 transmits the test packets received from the NP chip 42 to the test processing unit 3. The test processing unit 3 receives the test packets. Consequently, the test packets circulating on the transfer path of the loop shape are collected by the test processing unit 3.

The transmission/reception processing for the test packet is completed. Subsequently to this, as post-processing of the test, the test processing unit 3 performs inspection for the test packet collected, notifies a result of the test, and releases the test mode set by the preprocessing.

The test processing unit 3 inspects (or checks) the test packet received. First, the test processing unit 3 checks whether a packet length of the received test packet is the same as a packet length described in a header of the test packet. Second, the test processing unit 3 checks whether a data comparison error occurs in content of the received test packet. Third, the test packet processing unit 3 checks whether the number of test packets transmitted finally and the number of test packets received coincide with each other (or the test packets are not discarded). Fourth, the test processing unit 3 checks whether a packet transfer amount calculated by Equations (1) and (2) is a proper value with respect to a specification of the test object router 1 (or a through put is proper).

Equation (1) is an equation for calculating a bit rate (bps: bits/second) and is defined as follow: packet transfer amount (bps)=(count value of a packet transfer counter on a transfer path)×(packet length (bit)/test time (second)). Equation (2) is an equation for calculating throughput of packets (pps: packet/second) and is defined as follow: packet transfer amount (pps)=(count value of a packet transfer counter on a transfer path)/(test time (second)).

The test processing unit 3 notifies the maintenance console connected to the test object router 1 of a result of the inspection. Instead of this notice, the test processing unit 3 may store a record in the memory.

Moreover, according to processing opposite to the processing described above, the test processing unit 3 releases the setting of the loop by the loop setting unit 33, releases the setting of inhibition of decrement of the TTL value by the TTL setting unit 32, and releases the setting of the routing table 421 by the table setting unit 31. That is, the test processing unit 3 brings the test object router 1 into the state in FIG. 5A.

Figure 7B:
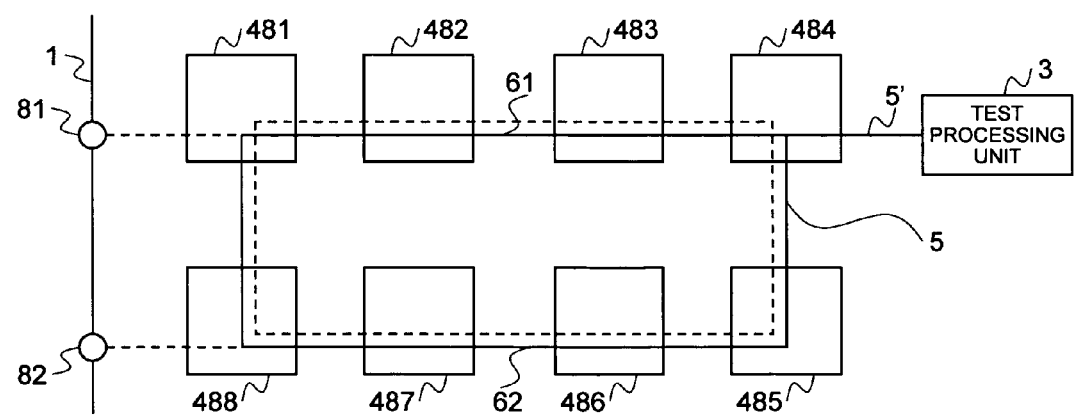

As shown in FIG. 7B, a plurality of circuit units 481 to 488 may be present on the transfer path set in the loop shape. That is, in the test object router 1, circuit units present on the transfer path set in the loop shape are not limited to the three chips, namely, the SW chip 41, the NP chip 42, and the PHY chip 43.

In the case of FIG. 7B, any one of the circuit units 481 to 488 only has to include a loop back path in advance. For example, loop back paths are included in any of the circuit units 481 and 488 connected to the input terminal 81 and the output terminal 82 of the test object router 1 in advance among the circuit units 481 to 488. Similarly, circuits corresponding to the SW chip 41 are included in any of the circuit units 484 and 485 provided near the test processing unit 3 in advanced among the circuit units 481 to 488. The circuit units 482, 483, 486, and 487 present on the transfer path other than the circuit units described above have the same structure as the NP chip 42 shown in FIG. 2B. The circuit units 484 and 485 may have the same structure as the NP chip 42 to route a packet (a test packet).

FIG. 8 is a router test processing flow according to the invention, and shows an example of router test processing executed in the test object router 1.

The test processing unit 3 sets an initial value "0" in a parameter "len", and sets the upper limit value "limit" of the data transfer amount in a parameter "limit" according to an input instruction of an operator (step S1), and starts a test according to an input instruction of the operator.

First, the test processing unit 3 performs preprocessing of the test. The loop setting unit 33 connects the transmission path 62 and the reception path 61 by using the loop back path 71 of the loop control unit 431 of the PHY chip 43, and sets a transfer path of a loop shape (step S2). The table setting unit 31 sets the test packet to circulate in the apparatus by setting the routing table 421 of the NP chip 42 (step S3). At this time, the TTL setting unit 32 sets decrement of a TTL value in the NP chip 42 to be inhibited by the TTL inhibiting unit 422 (step S4).

Thereafter, the test processing unit 3 starts transmission processing for the test packet. In this transmission processing, the test processing unit 3 sets a value obtained by adding an amount of data of the test packet transmitted to a variable "len" at that point as the variable "len" (step S5), compares the parameter "len" and the parameter "limit", and checks whether "len"≧"limit" is satisfied (step S6). When "len"≧"limit" is not satisfied, the test processing unit 3 repeats step S5.

When "len"≧"limit" is satisfied, the test processing unit 3 ends the transmission processing for the test packet, and comes into a waiting state for end of the test. Thereafter, the test processing unit 3 starts collection processing for the test packets. The test processing unit 3 waits for a predetermined time to pass away after "len"≧"limit" is satisfied (step S7), and sets the test processing unit 3 (the processor 2) as a destination of the circulating packets by changing the routing table 421 (step S8).

Since the test packets are transmitted to the test processing unit 3 according to this change, the test processing unit 3 receives the test packets (step S9), checks (or inspects) content of the test packets received (step S10), and then performs post-processing of the test processing (step S11).

Figures 9A, 9B:
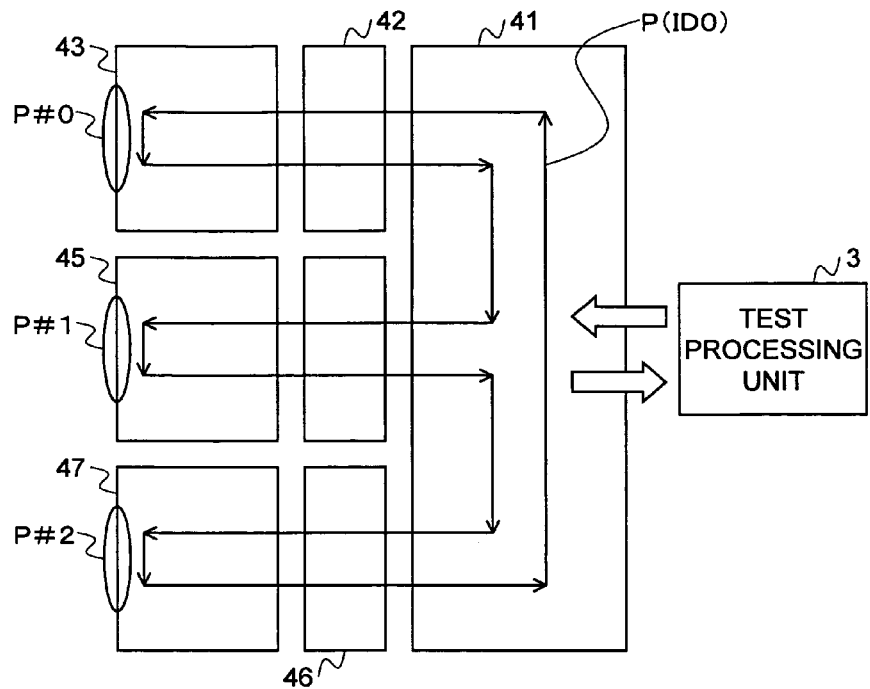
FIGS. 9A and 9B are a diagram for explaining a specific example of the router test method according to the invention.

FIGS. 9A and 9B are diagrams for explaining a router test method according to the invention. FIG. 9A shows one transfer path of a loop shape, and FIG. 9B shows an example of setting of the routing table 421 in the transfer path in FIG. 9A This example indicates an example in which one transfer path of the loop shape is set in the test object router 1, that is, an example in which the respective ports #0 to #2 of the test object router 1 are connected by one transfer path.

The test processing unit 3 generates a test packet, a transmission destination of which is the port #0 and an identification number of which is ID0, (hereinafter referred to as packet P(ID0)), and transmits the packet P(ID0) to the SW chip 41. The SW chip 41 transmits the packet P(ID0) to the NP chip 42 corresponding to the port #0. The NP chip 42 transmits the packet P(ID0) to the PHY chip 43 having the port #0. In the PHY chip 43, the packet P(ID0) having reached the port #0 is transmitted to the NP chip 42 by the loop back path 71 as the packet P(ID0) received by the port #0.

The NP chip 42 transmits the packet P(ID0) received from the port #0 (the PHY chip 43) to the SW chip 41 according to the routing table 421. As shown in FIG. 9B, when the test packet of ID0 is received from the port #0, the routing table 421 indicates that a transmission destination (a transfer destination) of the test packet is set to the port #1. Therefore, the NP chip 42 sets a description of a transmission destination in a header of the packet P(ID0) to the port #1. Since the routing table 421 also defines packets received from the ports #1 and #2, the setting is applied not only to the NP chip 42 but to the NP chips 44 and 46.

Similarly, the SW chip 41 transmits the packet P(ID0) to the NP chip 44 corresponding to the port #1. The NP chip 44 transmits the packet P(ID0) to the port #1. The packet P(ID0) having reached the port #1 is transmitted to the NP chip 44. The NP chip 44 changes the transmission destination of the packet P(ID0), which is received from the port #1, to the port #2, and then transmits the packet P(ID0) to the SW chip 41.

Similarly, the packet P(ID0) is transmitted from the SW chip 41 to the port #2 through the NP chip 46, and transmitted from the port #2 to the NP chip 46. The NP chip 46 changes the transmission destination of the packet P(ID0) to the port #0, and then transmits the packet P(ID0) to the SW chip 41.

Consequently, a transfer path of the packet P(ID0) is as described below. The packet P(ID0) is transmitted to the test processing unit 3, the port #0, the port #1, and the port #2 in this order. Thereafter, the packet P(ID0) is transmitted to the port #0, and transmitted to the port #0, the port #1, and the port #2 in this order. The packet P(ID0) is repeatedly transmitted in this way.

The test processing unit 3 continues to transmit a predetermined number (a number corresponding to the value "limit") of packets P(ID0). Since the packets P(ID0) have the identical identification number ID0, the packets P(ID0) circulate on the transfer path in the same manner as the above description. As a result, the predetermined number of packets P(ID0) are collected after circulating on the transfer path. This makes it possible to perform a data transfer margin test for the transfer path within the test object router 1.

Figures 10A, 10B:
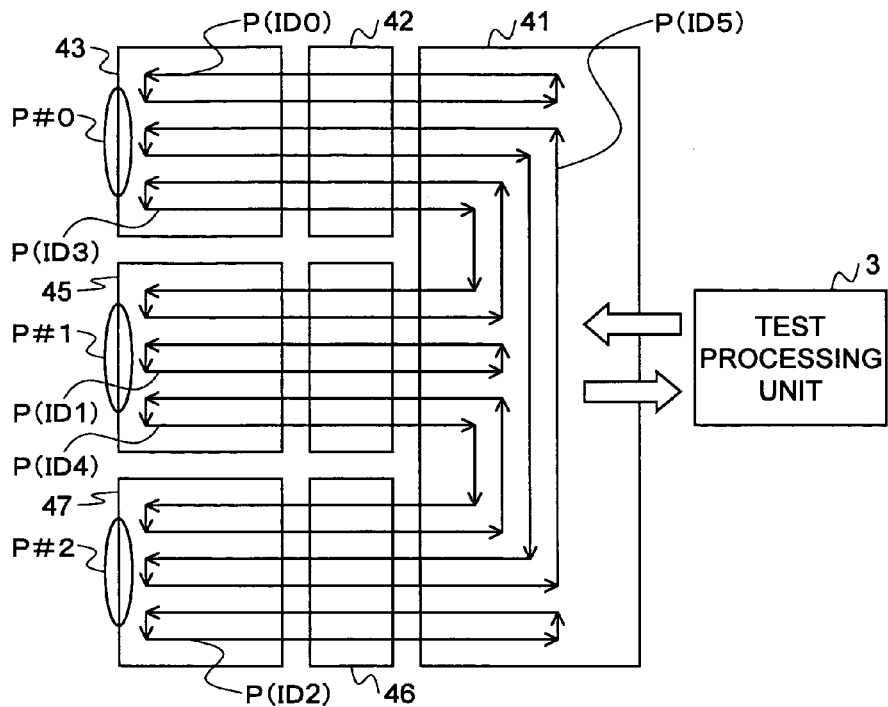
FIGS. 10A and 10B are a diagram for explaining another specific example of the router according to the invention.

FIGS. 10A and 10B are diagrams for explaining a router test method according to the invention. FIG. 10A shows a plurality of transfer paths, each of which has a loop shape, and FIG. 10B shows an example of setting of the routing table 421 in the transfer paths in FIG. 10A. This example indicates an example in which a plurality of transfer paths of the loop shapes are set in the test object router 1, that is, an example of transfer paths that takes into consideration a comprehensive combination of the respective ports #0 to #2 of the test object router 1.

As in the example in FIGS. 9A and 9B, the packet P(ID0) is transmitted from the SW chip 41 to the port #0 through the NP chip 42, and returned in the port #0 to be transmitted to the NP chip 42. The NP chip 42 sets a transmission destination of the packet P(ID0), which is received from the port #0, to the port #0 according to the routing table 421 shown in FIG. 10B, and then transmits the packet P(ID0) to the SW chip 41. Consequently, the packet P(ID0) is transmitted to the test processing unit 3, the port #0, . . . , and the port #0 in this order, and is repeatedly transmitted in this way.

Similarly, a packet P(ID1) is transmitted to the test processing unit 3, the port #1, . . . , and the port #1 in this order, and is repeatedly transmitted in this way. A packet P(ID2) is transmitted to the test processing unit 3, the port #2, . . . , and the port #2 in this order, and is repeatedly transmitted in this way.

On the other hand, a packet P(ID3) is transmitted from the SW chip 41 to the port #0, returned in the port #0, and transmitted to the NP chip 42. The NP chip 42 sets a transmission destination of the packet P(ID3), which is received from the port #0, to the port #1 according to the routing table 421, and then transmits the packet P(ID3) to the SW chip 41. Consequently, the packet P(ID3) is transmitted to the test processing unit 3, the port #0, the port #1, . . . , the port #0, and the port #1 in this order, and is repeatedly transmitted in this way.

Similarly, a packet P(ID4) is transmitted to the test processing unit 3, the port #1, the port #2, . . . , the port #1, and the port #2 in this order, and is repeatedly transmitted in this way. A packet P(ID5) is transmitted to the test processing unit 3, the port #0, the port #2, . . . , the port #0, and the port #2 in this order, and is repeatedly transmitted in this way.

A total number of the packets P(ID0) to P(ID5) is set to a predetermined number (a number corresponding to the value "limit"). For example, the numbers of the packet P(ID0), the packet P(ID1), and the packet P(ID2) are set as (the value "limit")×(1/9), respectively, and the numbers of the packet P(ID3), the packet P(ID4), and the packet P(ID5) are set as (the value "limit")×(2/9), respectively.

As a result, the predetermined number of packets P(ID0) to P(ID5) are collected after circulating on the transfer path. This makes it possible to perform a data transfer margin test for the transfer path within the test object router 1. In addition, according to the example in FIGS. 10A and 10B, as it is seen from comparison with FIGS. 9A and 9B, since switching in the SW chip 41 (or the communication path 5) is complicated, it is possible to perform a data transfer margin test for the SW chip 41 (or the communication path 5).

Figure 11:
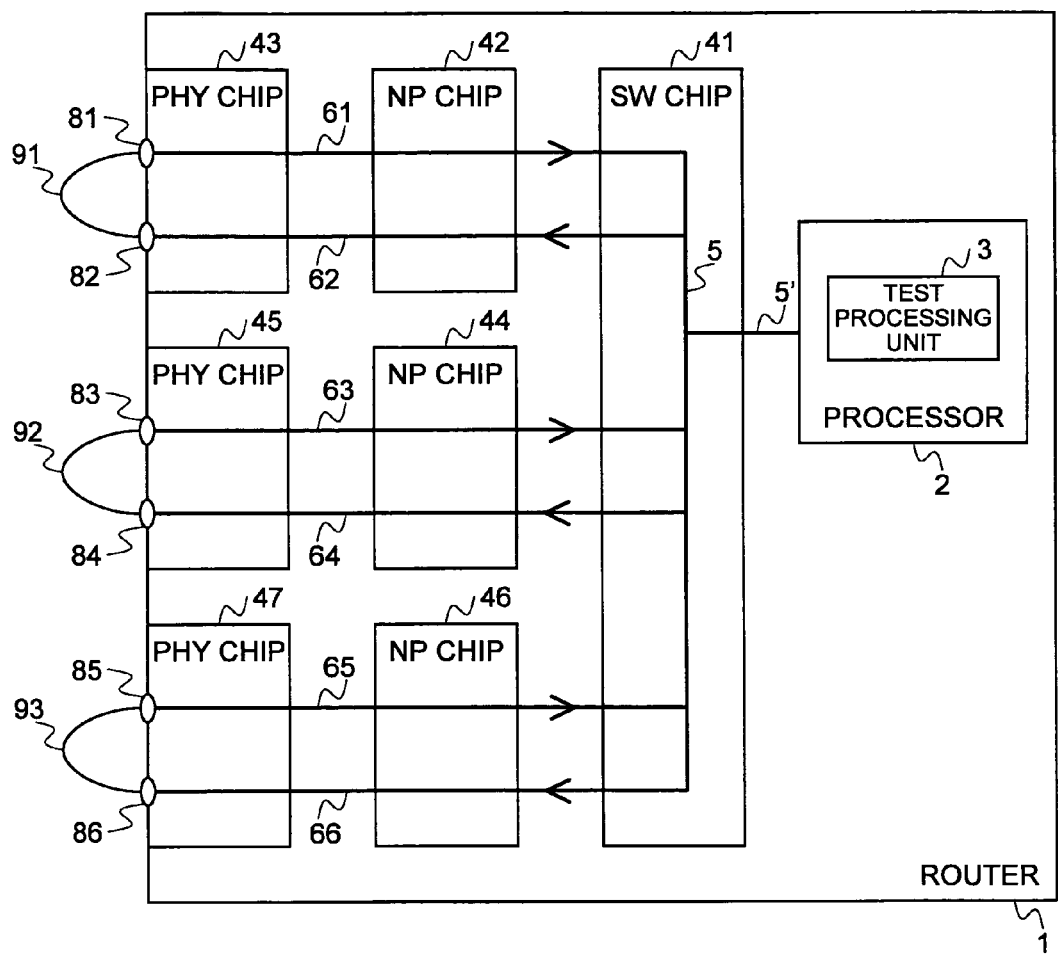
FIG. 11 is a diagram showing another example of the structure of the router according to the invention.
Figure 12A:
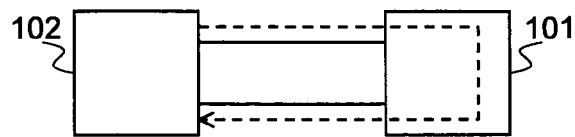
FIGS. 12A to 12D are a diagram for explaining a router test method in the background of the invention.
Figure 12B:
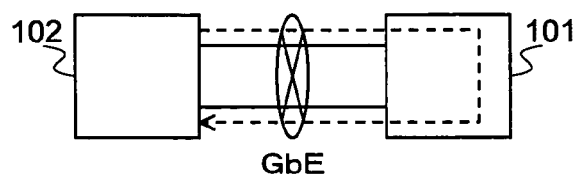
Figure 12C:
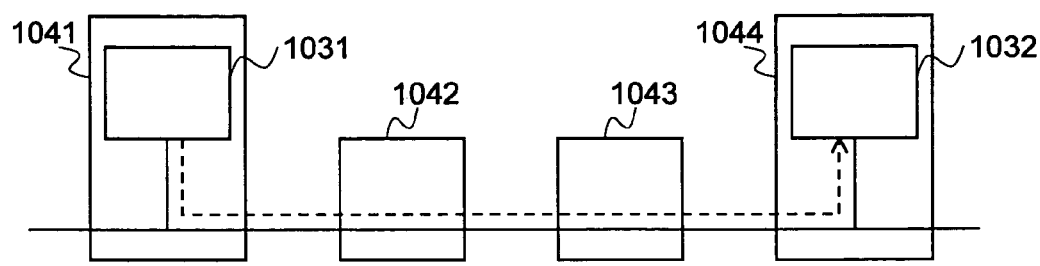
Figure 12D:
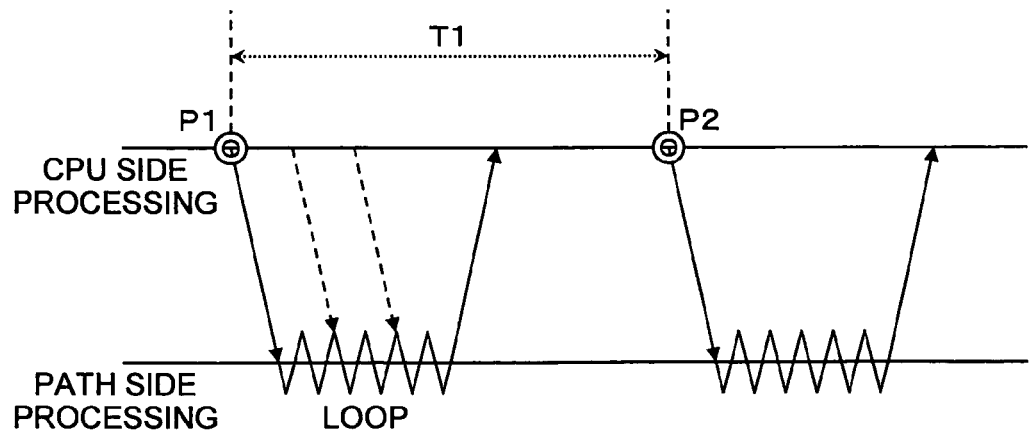

FIG. 11 is a diagram showing another example of the structure of the router including the test apparatus that realizes the router test method according to the invention.

This example is an example in which a transfer path is set in a loop shape by connecting the input terminal 81 and the output terminal 82 corresponding to each other (i.e., the identical port #0) in the router 1 using a connection cable 91 or the like. In this example, instead of the loop back paths 71, 72, and 73, connection cables 91, 92, and 93 are used for returning.

For example, in the port #0 of the test object router 1, the input terminal 81 and the output terminal 82 are connected to each other by the external connection cable 91. Therefore, in this example, a transfer path of a loop shape is formed by connecting the transmission path 62 and the reception path 61 using the connection cable 91. Transfer paths of the loop shape are formed between the input terminal 83 and the output terminal 84, and between the input terminal 85 and the output terminal 86 in the same manner. Therefore, the respective ports #0 to #2 are returned by the connection cables 91, 92, and 93. This makes it possible to form transfer paths of the loop shape, even if the loop back paths 71, 72, and 73 are not used or the router 1 does not include the loop back paths 71, 72, and 73. Also, in the test processing unit 3, the loop setting unit 33 can be omitted.

On the plurality of transfer paths of the loop shape shown in FIG. 11, one transfer path of the loop shape shown in FIGS. 9A and 9B may be set or the plurality of transfer paths of the loop shapes shown in FIGS. 10A and 10B may be set.

The transfer path may be set in the loop shape without depending on the loop back path 71, the connection cable 91, or the like. For example, the transfer path may be set in the loop shape by transmitting, in any one of the plurality of circuit units present on the transfer path, a packet received from a reception path serving as a path on which a packet received by the test object router 1 is transmitted to a transmission path serving as a path on which a packet transmitted by the test object router 1 is transmitted.

As described above, according to the invention, in a test method for a network relay apparatus such as a router and a network relay apparatus, it is possible to create a state in which data such as a packet continue to circulate on a transfer path, and create a state of a performance limit for a function of data transfer processing. This makes it possible to actually perform a test of a margin for the function of the data transfer processing within the network relay apparatus, using a function provided in the network relay apparatus. Therefore, it is possible to prevent the network relay apparatus from being a cause of occurrence of a failure since of a lack of a margin of the function of the data transfer processing (a lack of a margin with respect to noise jitter of a signal), and prevent occurrence of a failure of a network.

What is claimed is:

1. A method for testing a network relay apparatus to test a transmission and reception ability of a network relay apparatus, the test method comprising:
   setting a transfer path in the network relay apparatus in a loop shape;
   inhibiting decrement of a TTL (Time to Live) value in at least one circuit unit that is present on the transfer path and decrements the TTL value included in data packets transmitted via the at least one circuit unit;
   setting a routing table in at least one circuit unit that is present on the transfer path and includes the routing table, to transmit the data along the transfer path set in the loop shape;
   transmitting a predetermined number of data on the transfer path set in the loop shape to thereby circulate the predetermined number of data on the transfer path set in the loop shape; and
   inspecting the data after being circulated.

2. The test method for a network relay apparatus according to claim 1, wherein the transfer path is set in the loop shape by connecting, within the network relay apparatus, a reception path serving as a path on which data received by the network relay apparatus is transmitted and a transmission path serving as a path on which data transmitted by the network relay apparatus is transmitted.

3. The test method for a network relay apparatus according to claim 2, wherein the reception path and the transmission path are connected by a loop back path included in the network relay apparatus.

4. The test method for a network relay apparatus according to claim 3, wherein the loop back path is included in advance in any one of a plurality of circuit units present on the transfer path.

5. The test method for a network relay apparatus according to claim 4, wherein the loop back path is included in advance in a circuit unit connected to an input terminal and an output terminal of the network relay apparatus among the plurality of circuit units present on the transfer path.

6. The test method for a network relay apparatus according to claim 1, wherein the transfer path is set in the loop shape by connecting an input terminal and an output terminal of the network relay apparatus using a connection cable.

7. The test method for a network relay apparatus according to claim 1, wherein the transfer path is set in the loop shape by transmitting, in any one of a plurality of circuit units present on the transfer path, data received from a reception path serving as a path on which data received by the network relay apparatus is transmitted to a transmission path serving as a path on which data transmitted by the network relay apparatus is transmitted.

8. The test method for a network relay apparatus according to claim 1, wherein the data circulated are collected by changing, in at least one circuit unit that is present on the transfer path and includes the routing table, the routing table such that data received by the circuit unit is transmitted to a circuit unit that performs the inspection.

9. The test method for a network relay apparatus according to claim 8, wherein the routing table is changed when a predetermined time passes away after the predetermined number of data are circulated on the transfer path.

10. The test method for a network relay apparatus according to claim 1,
    wherein the network relay apparatus includes a plurality of reception paths serving as paths on which data received by the network relay apparatus is transmitted and a plurality of transmission paths serving as paths on which data transmitted by the network relay apparatus is transmitted, and
    wherein the transfer path is set in the loop shape by combining any one of the plurality of reception paths and any one of the plurality of transmission paths.

11. The test method for a network relay apparatus according to claim 10, wherein the transfer path is set to one transfer path of a loop shape.

12. The test method for a network relay apparatus according to claim 10, wherein the transfer path is set to a plurality of transfer paths each of which is a loop shape.

13. The test method for a network relay apparatus according to claim 1, wherein the network relay apparatus is a router.

14. The test method for a network relay apparatus according to claim 1, wherein the data is circulated for a predetermined time on the transfer path set in the loop shape, before being inspected.

15. The test method for a network relay apparatus according to claim 1, wherein the data is inspected after being circulated by performing at least one of
    checking whether length of each of the predetermined number of data was preserved during the circulating of the data, checking whether the data was altered, and checking whether a number of recovered data is the same as the predetermined number of data transmitted and circulated on the transfer path set in the loop shape.

16. A network relay apparatus capable of testing a transmission and reception ability thereof, the network relay apparatus comprising:

loop setting means for setting a transmission path in the network relay apparatus in a loop shape;

TTL setting means for inhibiting decrement of a TTL value in at least one circuit unit that is present on the transfer path and decrements a TTL value included in data transmitted via the at least one circuit unit;

setting means for setting a routing table, in at least one circuit unit that is present on the transfer path and includes the routing table, to transmit the data along the transfer path set in the loop shape; and test processing means for transmitting a predetermined number of data on the transfer path set in the loop shape to thereby circulate the predetermined number of data on the transfer path set in the loop shape, and inspecting the data after being circulated.

17. A router capable of testing a transmission and reception ability thereof, the router comprising:

loop setting means for setting a transmission path in the router in a loop shape;

TTL setting means for inhibiting decrement of a TTL value in at least one circuit unit that is present on the transfer path and decrements the TTL value included in data which is to be transmitted via the at least one circuit unit;

setting means for setting a routing table in at least one circuit unit that is present on the transfer path and includes the routing table, to transmit the data along the transfer path set in the loop shape; and test processing means for transmitting a predetermined number of data on the transfer path set in the loop shape to thereby circulate the predetermined number of data on the transfer path set in the loop shape, and inspecting the data after being circulated.

* * * * *

UNITED STATES PATENT AND TRADEMARK OFFICE
CERTIFICATE OF CORRECTION

PATENT NO. : 7,729,265 B2
APPLICATION NO. : 11/638393
DATED : June 1, 2010
INVENTOR(S) : Masayuki Kanno It is certified that error appears in the above-identified patent and that said Letters Patent is hereby corrected as shown below:

On the Title page, Item (73) delete "Fujistu" and insert --Fujitsu--.

Column 16, Line 11 before "transmitted" delete "which is to be".

Signed and Sealed this

Seventh Day of December, 2010

David J. Kappos
*Director of the United States Patent and Trademark Office*